United States Patent

[11] 3,607,314

[72] Inventor Robert C. Lugiewicz
   Pittsburgh, Pa.
[21] Appl. No. 764,725
[22] Filed Oct. 3, 1968
[45] Patented Sept. 21, 1971
[73] Assignee Cubb-Pac Corporation
   Pittsburgh, Pa.
   Continuation-in-part of application Ser. No. 526,412, Feb. 10, 1966, now Patent No. 3,414,936.

[54] METHOD OF PROCESSING BONELESS MEAT PIECES FOR SUBSEQUENT GRINDING
   8 Claims, 3 Drawing Figs.
[52] U.S. Cl. .................................................. 99/194, 99/108
[51] Int. Cl. ............................................. A22c 18/00, A23b 1/00
[50] Field of Search ......................................... 99/107, 108, 109, 194, 174, 175, 176; 17/37, 40

[56] References Cited
   UNITED STATES PATENTS
| | | | |
|---|---|---|---|
| 1,890,215 | 12/1932 | De Cressey .................. | 99/109 X |
| 2,860,991 | 11/1958 | Christianson et al. ........ | 99/109 |
| 3,316,104 | 4/1967 | Lugiewicz .................... | 99/194 |

Primary Examiner—Hyman Lord
Attorney—Learman and McCulloch

ABSTRACT: Discrete pieces of meat are introduced to a housing having a screw conveyor therein which compacts the meat pieces into a solid bar that is fed to and through a horn which communicates with the housing tangentially and laterally of the axis of the housing. The bar is extruded from the horn into a casing formed of an elastic, flexible material which has spaced openings therein and which is withdrawn from the horn by the bar as the latter is extruded. At the discharge end of the horn the casing is stretched radially and the meat bar expands radially. The expansion of the meat bar and the elasticity of the casing cooperate to fit the casing so tightly about the bar that those portions of the bar opposite the openings in the casing protrude therethrough. The bar is cut into substantially uniform lengths which are frozen for shipment to meat markets for subsequent grinding of the meat.

PATENTED SEP 21 1971
3,607,314
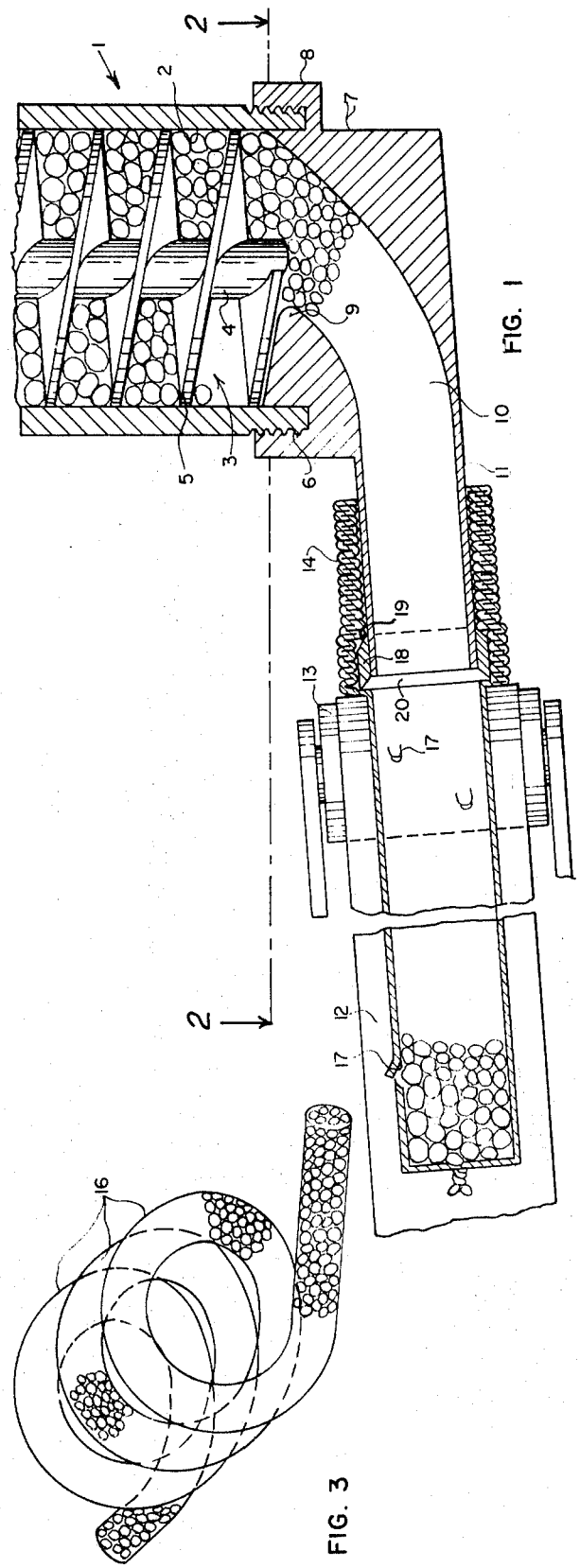
FIG. 1
FIG. 3
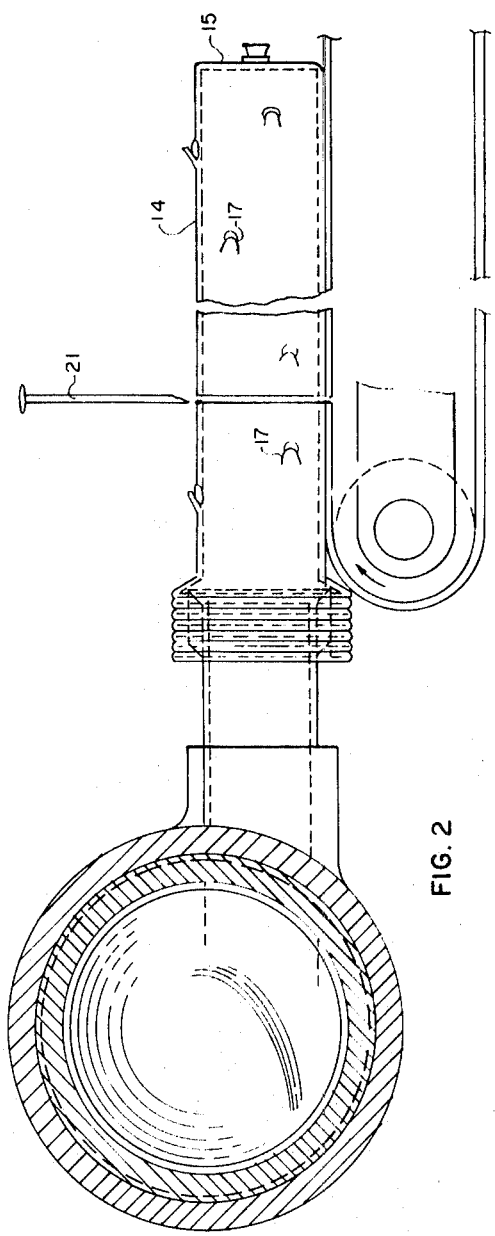
FIG. 2
INVENTOR.
ROBERT C. LUGIEWICZ
BY
Learman & McCulloch

METHOD OF PROCESSING BONELESS MEAT PIECES FOR SUBSEQUENT GRINDING

RELATED APPLICATION

This application is a continuation-in-part of application Ser. No. 526,412, filed Feb. 10, 1966, now U.S. Pat. No. 3,414,936.

This invention relates to meat products and to methods and apparatus for processing such meat products. More particularly the invention pertains to the encasing of discrete pieces of boneless beef or the like in individual sticks or bars for subsequent grinding.

Apparatus and methods of the general class to which the invention pertains are disclosed in U.S. Pat. Nos. 3,316,104 and 3,414,936, to which reference may be had for a more detailed description of the general considerations involved in products to which the invention relates.

An object of the invention is to provide apparatus and methods for packing discrete pieces of boneless beef or the like in a flexible casing and in which the generation of heat by the packing apparatus is minimized substantially.

Another object of the invention is to provide methods and apparatus of the character described and wherein the number of turns or bends which the pieces to be packed must negotiate is substantially reduced, thereby minimizing the risk of tearing or cutting the product, as well as reducing the pressure to which the product is subjected during the packaging process.

A further object of the invention is to provide methods and apparatus for encasing meat in bar form and in which the casing material and the meat contained therein cooperate to prevent inadvertent separation of the casing and the meat.

Another object of the invention is to provide methods and apparatus for extruding meat in a continuous bar and at high speed into a thin, fairly fragile casing and without risking splitting of the casing.

Other objects and advantages of the invention will be pointed out specifically or will become apparent from the following description when it is considered in conjunction with the appended claims and the accompanying drawings, in which:

FIG. 1 is a fragmentary view, partly in horizontal section and partly in top plan, of apparatus constructed in accordance with the invention;

FIG. 2 is a sectional view taken along the line 2—2 of FIG. 1 and turned through 180°; and FIG. 3 is a perspective view diagrammatically illustrating the manner in which meat pieces are propelled through and discharged from the apparatus.

Apparatus constructed in accordance with the disclosed embodiment of the invention comprises an elongated, tubular housing 1 having a cylindrical chamber 2 closed at one end and open at the other end. Secured to and in communication with the closed or receiving end of the cylinder is an upstanding tubular column (not shown) at the upper end of which is a conventional tray or bowl (not shown). The housing and its related structure are like those shown in the aforementioned U.S. Pat. No. 3,414,936. Discrete pieces or chunks of boneless beef or the like may be introduced to the closed end of the cylinder 2 via the column.

Mounted in the housing 1 is a rotatable feeding screw 3 comprising a shaft 4 journaled in suitable bearings (not shown). The shaft 4 may be coupled to an electric motor (not shown) or the like so as to be rotated thereby in the usual manner. The feeding means also includes a helical flight or vane 5 which is secured to the shaft 4 for rotation therewith and which preferably has a uniform, predetermined pitch with respect to the longitudinal axis of the cylinder 2. The diameter of the vane 5 corresponds substantially to the inside diameter of the cylinder 2 with sufficient clearance to permit free rotation of the feeding means within the housing.

The axial length of the vane 5 corresponds substantially to the length of the housing 1 and terminates adjacent the discharge end of the latter. At its discharge end the housing 1 is exteriorly threaded as at 6 so as removably to accommodate a receiving head 7 having a mounting flange 8 that is threaded to correspond to the threads 6.

The head 7 at the flange 8 is annular in cross section and includes an inlet 9 which tapers radially inwardly in a direction in axial prolongation of the cylinder 2 and merges smoothly into a discharge passage 10 formed in a horn or tube 11 which extends substantially tangentially of the cylinder 2 and along a line that substantially parallels the pitch of the vane 5. That is, the axis of the passage 10 is offset from and inclined to the longitudinal axis of the housing 1 at an angle corresponding substantially to the pitch of the vane 5.

The taper of the inlet 9 is such that the cross-sectional area of the passage 10 corresponds substantially to one-half the cross-sectional area of the housing 1, less the cross-sectional area of the shaft 4. Stated differently, the cross-sectional area of the passage 10 should correspond substantially to one-half the cross-sectional area of the space between the shaft 4 and the interior wall of the cylinder 2.

The discharge passage 10 terminates in an open end which overlies one end of an endless conveyor belt 12 that is trained around driven rolls, one of which is shown at 13, which are driven in the direction of the arrow in FIG. 2 by a suitable motor (not shown). A flexible, elongated casing 14 having the properties of resiliency and elasticity is adapted to be installed over the open end of the horn 11 and has one closed end 15 which initially is so located as to be quite close to the open end of the horn. The casing can be formed of any natural or synthetic casing material presently in use for the encasing of meat and having the aforementioned properties.

In the operation of the apparatus thus far described, discrete meat pieces are introduced to the receiving end of the housing 1 during rotation of the feeding means 3. The meat pieces are entrained and compacted by the vane 5 and are fed toward the discharge end of the housing 1 in the form of a solid, helical bar or coil having parallel convolutions 16 (see FIG. 3), the axial thickness of the coils 16 being determined by the spacing between adjacent convolutions of the vane 5. The meat pieces are not ground or comminuted; they retain their original character and are merely compacted into solid bar form.

The construction of the receiving member 7 is such that the passage 10 not only is substantially tangential to the housing 1, but is inclined laterally of the latter so as to extend along a line which is substantially parallel to the pitch of the vane 5. That is, the passage 10 is substantially parallel to the plane of the convolutions 16 of the meat coil. Meat discharged from the housing 1, therefore, leaves the latter without being subjected to any turning or bending forces. Accordingly, the pressure exerted on the meat pieces in the housing 1 by the vane 5 is maintained at a minimum. As a result, there will be minimum friction between the meat pieces, the vane, and the interior wall of the housing. Consequently, the generation of heat by friction is minimal.

At the discharge end of the housing 1 the leading end of the coil of meat pieces emerges tangentially as a solid bar and is guided by the inlet 9 naturally into the passage 10 for discharge through the open end of the latter and into the casing 14. The taper of the inlet 9 prevents the formation of voids in the horn 11. As the bar of compacted meat pieces continues to be extruded or discharged from the horn 11, it enters or is introduced to the flexible casing 14 which is stripped off the horn. The thus encased meat is deposited on the conveyor 12 so as to be supported and carried away thereby. The conveyor is driven at a speed corresponding to the speed of extrusion of the meat bar.

The casing 14 is provided with a plurality of preferably semicircular openings or perforations 17 spaced along the length of the casing. The perforations permit air to be drawn into the casing as the latter is stripped off the horn, thereby preventing the collapse of the casing due to the creation of a partial vacuum therein. The openings perform another important function which will be described hereinafter.

The discrete meat pieces, being both radially and axially compacted to some extent to form the solid bar, have a certain natural tendency to expand radially as the bar passes the discharge end of the horn. This is due partly to the inherent resiliency of the animal tissue and partly due to the elimination of the small amount of frictional resistance to the passage of the bar through the horn. If the speed of extrusion is rapid, as is desirable, then the radial expansion of the bar at the mouth of the horn occurs quite rapidly and may cause splitting of the rather fragile casing. According to the invention this problem is overcome in two ways: firstly, the casing is stretched radially as it is withdrawn from the horn and, secondly, the rate of radial expansion of the bar is limited.

The stretching of the casing and the limiting of the expansion of the bar is effected by a tubular, preferably metal member 18 mounted on and fixed at the discharge end of the horn 11 so as to lie in the path of withdrawal of the casing from the horn. The maximum outside diameter of the tube 18 is slightly greater than that of the casing 14 so as to effect radial stretching of the casing as the latter passes over the annulus, but the maximum diameter of the tube is not so great as to stretch the casing beyond its elastic limit. As a consequence, the casing will tend to contract as it passes beyond the annulus. The upstream end 19 of the tube 18 has a minimum diameter that corresponds to that of the casing, the tube being tapered radially outwardly toward its discharge end to provide for a gradual application of stretching force on the casing.

The tube 18 projects beyond the mouth of the horn and is provided with an outwardly diverging inner surface 20 the axial length of which corresponds to the distance the tube projects beyond the horn. As the bar emerges from the mouth of the horn it tends to expand, as stated earlier, but the rate of expansion can be no greater than that permitted by the diverging surface 20. Consequently, by the time the bar passes the free end of the annulus, the force of the expansion largely will have been dissipated against the metal tube 18, rather than against the more fragile casing.

As the bar emerges from the annulus, the diameters of both the bar and the casing will coincide substantially, with the result that any further slight expansion of the bar will act in conjunction with the inherent contraction of the casing to fit the latter tightly about the bar. In practice, the fit of the casing about the bar is so tight that those portions of the bar opposite the openings protrude therethrough. Such protrusions not only assist in the stripping of the casing off the horn, but also prevent inadvertent separation of the casing and the bar when the latter is cut into lengths.

As the encased meat moves along the conveyor 12, it passes under a vertically reciprocable knife 21 which may be actuated periodically to slice through the encased meat and cut the latter into individual sticks or sections of predetermined length, following which the sticks may be frozen and stored or shipped, as is required.

The disclosed apparatus and methods are representative of presently preferred forms of apparatus and methods for producing meat sticks or bars, but are intended to be illustrative rather than definitive of the invention. The invention is defined in the claims.

I claim:

1. A method of processing boneless meat pieces for subsequent grinding comprising introducing discrete pieces of meat into a chamber; compacting said discrete pieces of meat into a helical coil having a leading end; applying force to the convolutions of said coil to extend said leading end; guiding said leading end of said coil from said chamber in a direction substantially tangential of said convolutions, whereby said compacted meat pieces emerge from said chamber as a solid bar of meat; and introducing said bar into a resilient casing.

2. The method set forth in claim 1 including stretching said casing radially within its elastic limit prior to the introduction of said bar thereto, whereby said casing contracts to fit tightly about said bar.

3. The method set forth in claim 1 wherein said casing has openings spaced along its length and wherein said bar is encased so tightly within said casing as to cause portions of the bar at said openings to protrude therethrough.

4. A method of processing boneless meat for subsequent grinding comprising compacting discrete pieces of said meat into solid bar form under sufficient radial pressure as to compress said bar radially; introducing said bar into a resilient casing and simultaneously relieving radial pressure on said bar; and radially stretching said casing within its elastic limit prior to the introduction of said bar thereto, whereby said casing contracts radially to fit tightly about said bar.

5. The method set forth in claim 4 wherein the relieving of radial pressure on said bar commences prior to the introduction of said bar into said casing.

6. The method set forth in claim 4 wherein said casing has openings spaced along its length and wherein said casing is fitted so tightly about said bar that portions of the latter at said openings protrude therethrough.

7. The method set forth in claim 4 including cutting said bar into lengths.

8. The method set forth in claim 7 including freezing said lengths.